United States Patent
Chuang et al.

(10) Patent No.: US 10,637,625 B2
(45) Date of Patent: Apr. 28, 2020

(54) TRACKING REFERENCE SIGNAL AND FRAMEWORK THEREOF IN MOBILE COMMUNICATIONS

(71) Applicant: MediaTek Inc., Hsinchu (TW)

(72) Inventors: Chiao-Yao Chuang, Hsinchu (TW);
Song-Jheng Lin, Hsinchu (TW);
Jianxuan Du, Irvine, CA (US);
Yen-Hui Yeh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 79 days.

(21) Appl. No.: 15/969,510

(22) Filed: May 2, 2018

(65) Prior Publication Data

US 2018/0323918 A1    Nov. 8, 2018

Related U.S. Application Data

(60) Provisional application No. 62/587,633, filed on Nov. 17, 2017, provisional application No. 62/570,682,
(Continued)

(51) Int. Cl.
*H04L 25/02* (2006.01)
*H04L 5/00* (2006.01)
(Continued)

(52) U.S. Cl.
CPC ............ *H04L 5/005* (2013.01); *H04B 7/024* (2013.01); *H04L 5/0048* (2013.01);
(Continued)

(58) Field of Classification Search
CPC . H04L 5/0048; H04L 27/261; H04L 27/2657; H04L 5/005; H04W 72/042;
(Continued)

(56) References Cited

U.S. PATENT DOCUMENTS

| 2013/0114535 A1* | 5/2013 | Ng | H04W 72/0446 370/329 |
| 2013/0279437 A1* | 10/2013 | Ng | H04W 48/16 370/329 |
| 2015/0030037 A1* | 1/2015 | Ahn | H04L 27/2655 370/503 |

FOREIGN PATENT DOCUMENTS

| CN | 103391622 A | 11/2013 |
| CN | 104160766 A | 11/2014 |

(Continued)

OTHER PUBLICATIONS

Taiwan Intellectual Property Office, Office Action for Taiwan Patent Application No. 107115052, dated Jun. 5, 2019.
(Continued)

*Primary Examiner* — Awet Haile
(74) *Attorney, Agent, or Firm* — Han IP PLLC; Andy M. Han

(57) ABSTRACT

Techniques and examples of tracking reference signal and framework thereof in mobile communications are described. A user equipment (UE) receives, from a base station of a network, a reference signal via a communication link between the UE and the base station. The reference signal contains resource configuration with respect to tracking reference signal (TRS) configuration. The UE also receives, from the base station, a TRS burst containing a plurality of TRS symbols with one or more components of the UE configured according to the TRS configuration. The UE processes the TRS burst to perform channel estimation, synchronization, time tracking, frequency tracking, or a combination thereof.

20 Claims, 15 Drawing Sheets

Related U.S. Application Data filed on Oct. 11, 2017, provisional application No. 62/568,941, filed on Oct. 6, 2017, provisional application No. 62/567,412, filed on Oct. 3, 2017, provisional application No. 62/566,773, filed on Oct. 2, 2017, provisional application No. 62/566,769, filed on Oct. 2, 2017, provisional application No. 62/557,196, filed on Sep. 12, 2017, provisional application No. 62/556,552, filed on Sep. 11, 2017, provisional application No. 62/541,823, filed on Aug. 7, 2017, provisional application No. 62/520,623, filed on Jun. 16, 2017, provisional application No. 62/501,903, filed on May 5, 2017.

(51) Int. Cl.
  *H04L 27/26* (2006.01)
  *H04W 72/04* (2009.01)
  *H04B 7/024* (2017.01)

(52) U.S. Cl.
  CPC ........ *H04L 25/0232* (2013.01); *H04L 27/261* (2013.01); *H04L 27/2657* (2013.01); *H04W 72/042* (2013.01); *H04W 72/044* (2013.01)

(58) Field of Classification Search
  CPC ........... H04W 72/0446; H04W 72/044; H04W 24/10; H04W 48/12; H04W 56/001; H04W 72/1278; H04W 28/18; H04W 72/12; H04B 7/024
  See application file for complete search history.

(56) References Cited

FOREIGN PATENT DOCUMENTS

| | | |
|---|---|---|
| CN | 106105292 A | 11/2016 |
| WO | WO 2014113961 A1 | 7/2014 |
| WO | WO 2017023043 A1 | 2/2017 |

OTHER PUBLICATIONS

State Intellectual Property Office, International Search Report and Written Opinion for International Patent Application No. PCT/CN2018/085483, dated Jul. 25, 2018.

State Intellectual Property Office, International Search Report and Written Opinion for International Patent Application No. PCT/CN2018/085483, dated Aug. 9, 2018.

\* cited by examiner

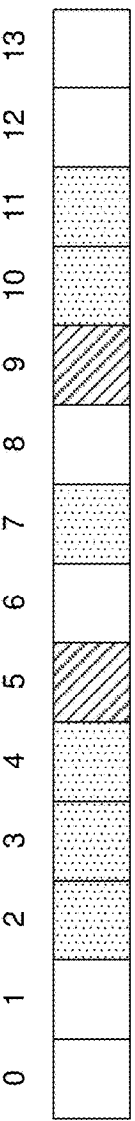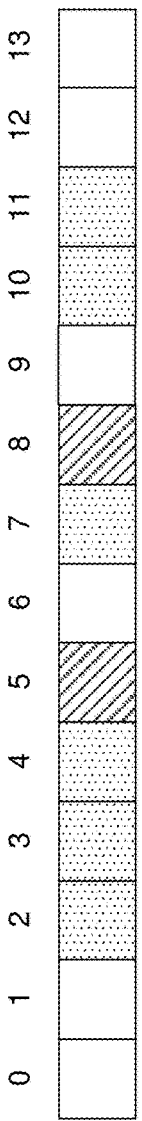
FIG. 4

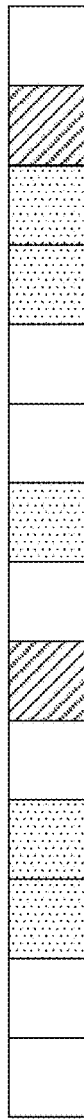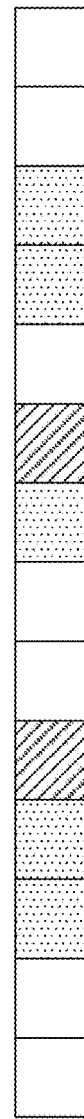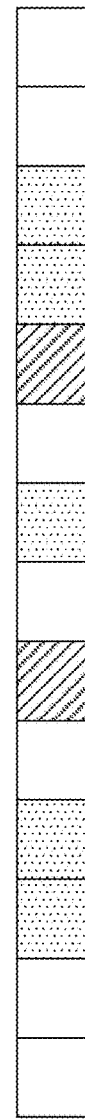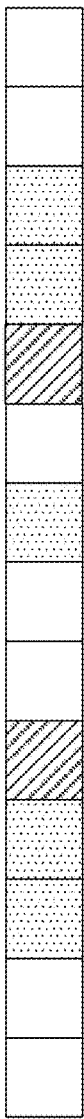
FIG. 5

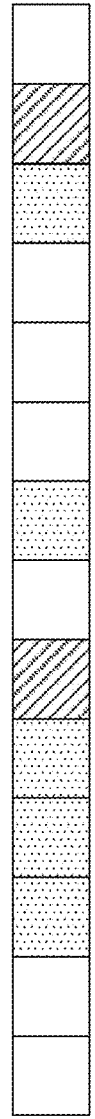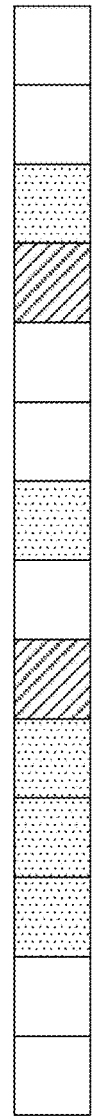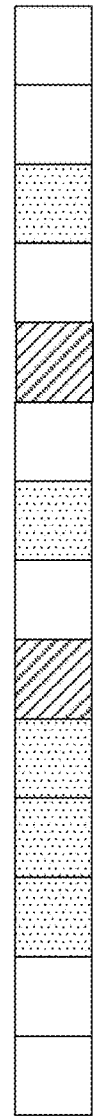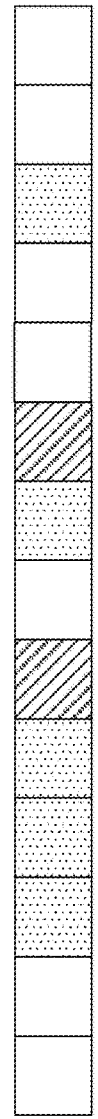
FIG. 6

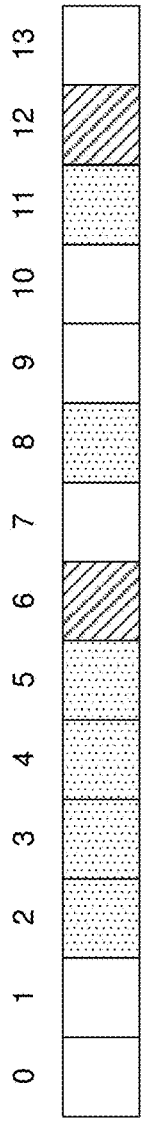
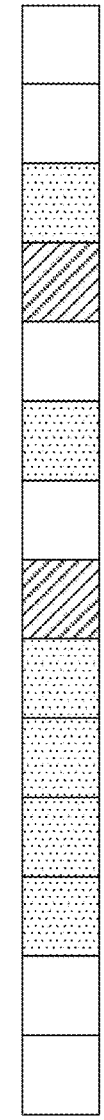
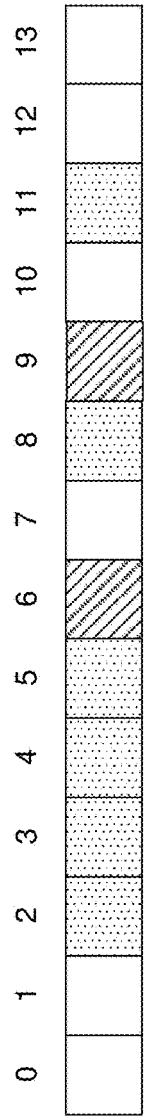
FIG. 7

1400

```
┌─────────────────────────────────────────────────────────────────┐
│ RECEIVE, BY A PROCESSOR OF A USER EQUIPMENT (UE) FROM A BASE    │
│ STATION OF A NETWORK, A REFERENCE SIGNAL VIA A COMMUNICATION    │
│ LINK BETWEEN THE UE AND THE BASE STATION, THE REFERENCE SIGNAL  │
│ CONTAINING RESOURCE CONFIGURATION WITH RESPECT TO TRACKING      │
│ REFERENCE SIGNAL (TRS) CONFIGURATION                            │
│ 1410                                                            │
└─────────────────────────────────────────────────────────────────┘
                                 │
                                 ▼
┌─────────────────────────────────────────────────────────────────┐
│ RECEIVE, BY THE PROCESSOR FROM THE BASE STATION, A TRS BURST    │
│ CONTAINING A PLURALITY OF TRS SYMBOLS WITH ONE OR MORE          │
│ COMPONENTS OF THE UE CONFIGURED ACCORDING TO THE TRS            │
│ CONFIGURATION                                                   │
│ 1420                                                            │
└─────────────────────────────────────────────────────────────────┘
                                 │
                                 ▼
┌─────────────────────────────────────────────────────────────────┐
│ PROCESS, BY THE PROCESSOR, THE TRS BURST TO PERFORM CHANNEL     │
│ ESTIMATION, SYNCHRONIZATION, TIME TRACKING, FREQUENCY TRACKING, │
│ OR A COMBINATION THEREOF                                        │
│ 1430                                                            │
└─────────────────────────────────────────────────────────────────┘
```

FIG. 14

TRACKING REFERENCE SIGNAL AND FRAMEWORK THEREOF IN MOBILE COMMUNICATIONS

CROSS REFERENCE TO RELATED PATENT APPLICATIONS

The present disclosure claims the priority benefit of U.S. Provisional Patent Application Nos. 62/501,931, filed on 5 May 2017, 62/520,623, filed on 16 Jun. 2017, 62/541,823, filed on 7 Aug. 2017, 62/556,552, filed on 11 Sep. 2017, 62/557,196, filed on 12 Sep. 2017, 62/566,769, filed on 2 Oct. 2017, 62/566,773, filed on 2 Oct. 2017, 62/567,412, filed on 3 Oct. 2017, 62/568,941, filed on 6 Oct. 2017, 62/570,682, filed on 11 Oct. 2017, and 62/587,633, filed on 17 Nov. 2017, the contents of which are herein incorporated by reference in their entirety.

TECHNICAL FIELD

The present disclosure is generally related to mobile communications and, more particularly, to tracking reference signal and framework thereof in mobile communications such as mobile communications in $5^{th}$ Generation (5G) New Radio (NR) networks.

BACKGROUND

Unless otherwise indicated herein, approaches described in this section are not prior art to the claims listed below and are not admitted as prior art by inclusion in this section.

The Third Generation Partnership Project (3GPP) currently specifies that a user equipment (UE) in radio resource control (RRC) connected mode is expected to receive the higher-layer UE-specific configuration of a channel state information reference signal (CSI-RS) resource set configured with higher-layer parameters. That is, the UE is to be configured by the higher-layer parameters with a CSI-RS resource set of a number of CSI-RS resources in a number of slots. For 5G NR networks, the concept of tracking reference signal (TRS) is to be realized using a CSR-RS resource set. That is, TRS can be configured by using a CSI-RS resource set with a couple of non-zero power (NZP) CSI-RS resources in the CSI-RS resource set. However, much of the framework remains to be defined.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect of the present disclosure, a method may involve a processor of a UE receiving, from a base station of a network, a reference signal via a communication link between the UE and the base station. The reference signal may contain resource configuration with respect to TRS configuration. The method may also involve the processor receiving, from the base station, a TRS burst containing a plurality of TRS symbols with one or more components of the UE configured according to the TRS configuration. The method may further involve the processor processing the TRS burst to perform channel estimation, synchronization, time tracking, frequency tracking, or a combination thereof. For instance, the method may involve the processor processing the TRS to perform time delay estimation, delay spread estimation, frequency offset estimation and Doppler spread estimation.

In one aspect of the present disclosure, an apparatus implementable in a UE may include a transceiver and a processor coupled to the transceiver. The transceiver may be capable of wirelessly communicating with a base station of a network. The processor may be capable of performing operations including: (1) receiving, via the transceiver from the base station, a reference signal via a communication link between the UE and the base station, the reference signal containing resource configuration with respect to TRS configuration; (2) receiving, via the transceiver from the base station, a TRS burst containing a plurality of TRS symbols with one or more components of the UE configured according to the TRS configuration; and (3) processing the TRS burst to perform channel estimation, synchronization, time tracking, frequency tracking, or a combination thereof. For instance, the processor may process the TRS to perform time delay estimation, delay spread estimation, frequency offset estimation and Doppler spread estimation.

It is noteworthy that, although description provided herein may be in the context of certain radio access technologies, networks and network topologies such as Long-Term Evolution (LTE), LTE-Advanced, LTE-Advanced Pro, 5G, NR and Internet-of-Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example scenario in accordance with an implementation of the present disclosure.

FIG. 5 is a diagram of an example scenario in accordance with an implementation of the present disclosure.

FIG. 6 is a diagram of an example scenario in accordance with an implementation of the present disclosure.

FIG. 7 is a diagram of an example scenario in accordance with an implementation of the present disclosure.

FIG. 14 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under a proposed scheme in accordance with the present disclosure, a number of parameters, X, Y, N, B, $S_f$ and $S_t$, are defined for a tracking reference signal (TRS) framework described herein. The parameter X denotes a length of TRS burst in terms of a number of 14-symbol slots. The parameter Y denotes a periodicity of a TRS burst in milliseconds (ms). The parameter N denotes a number of orthogonal frequency-division multiplexing (OFDM) symbols occupied by a TRS symbol within a slot. Accordingly, the number of TRS symbols in each slot of a TRS burst may be denoted by $N_1, N_2 \ldots N_X$ for slot 1, slot 2 . . . slot X, where $N_{total} = N_1 + N_2 + \ldots + N_X$. The parameter B denotes a TRS bandwidth in terms of a number of resource blocks (RBs). The parameter $S_f$ denotes a TRS subcarrier spacing in a frequency domain. The parameter $S_t$ denotes a TRS symbol spacing between two neighboring TRS symbols in a time domain. Accordingly, $S_{t1}, S_{t2} \ldots S_{t(Ntotal-1)}$ may denote the symbol spacing between two neighboring TRS symbols in all the slots of a given TRS burst.

Figure 15:
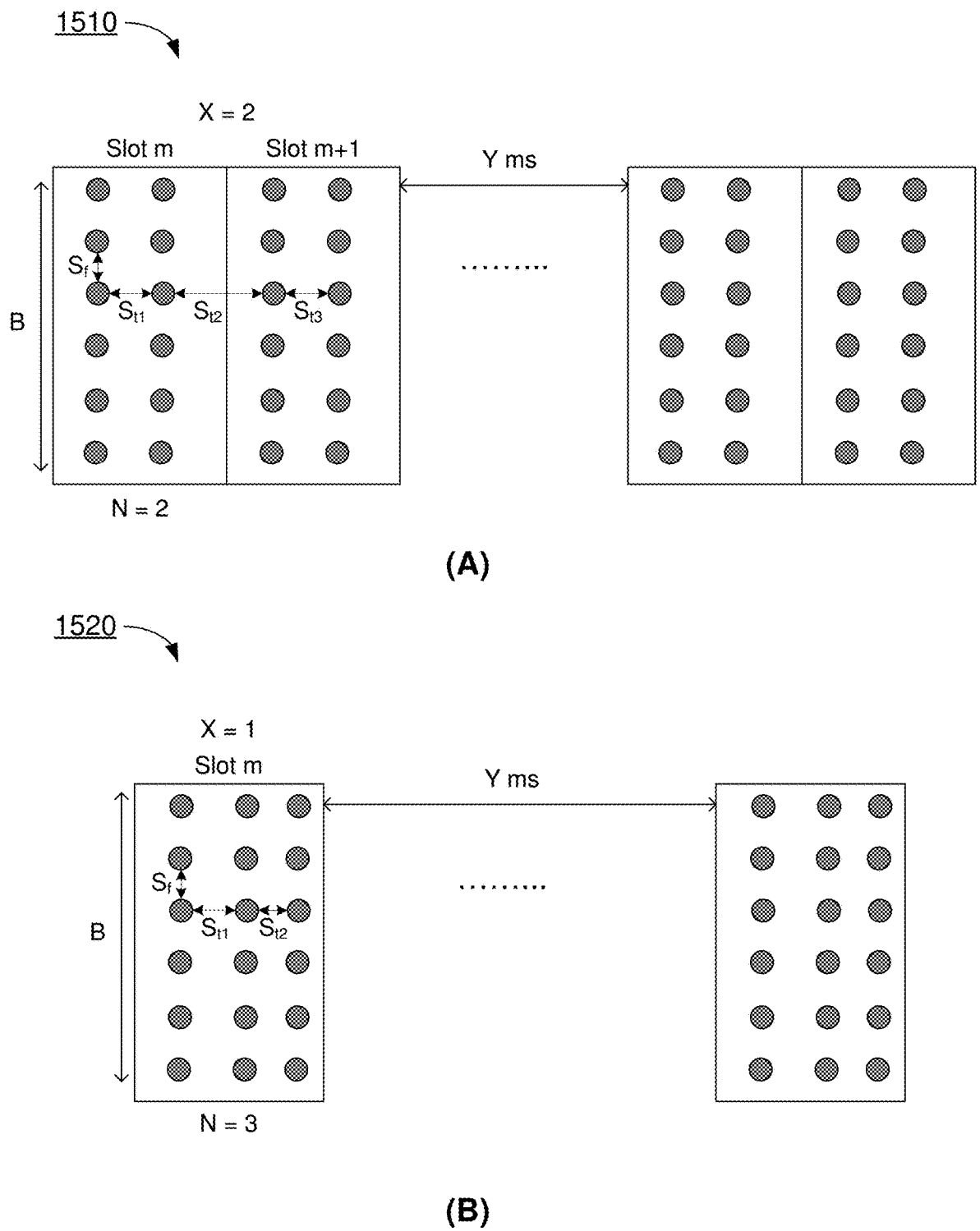
FIG. 15 is a diagram of example scenarios annotated with parameters defined in the present disclosure.

As reference, FIG. 15 illustrates an example scenario 1510 and an example scenario 1520 denoted by parameters used in the present disclosure. Referring to part (A) of FIG. 15, there are two slots, m and m+1, per TRS burst (X=2) which has a bandwidth B. The periodicity of the TRS burst is Y ms. Each TRS symbol within a slot of the TRS burst has two OFDM symbols (N=2). The TRS subcarrier spacing is $S_f$, and the TRS symbol spacing between two neighboring TRS symbols is $S_t$. Referring to part (B) of FIG. 15, there are one slot, m, per TRS burst (X=1) which has a bandwidth B. The periodicity of the TRS burst is Y ms. Each TRS symbol within a lot of the TRS burst has three OFDM symbols (N=3). The TRS subcarrier spacing is $S_f$, and the TRS symbol spacing between two neighboring TRS symbols is $S_t$.

Under the proposed scheme, a TRS burst may span over a plurality of slots. The number of OFDM symbols with TRS in each slot of a TRS burst may be the same as or different from that of other slots in the TRS burst. Symbol indexes of the OFDM symbols with TRS in each slot of a TRS burst may be the same as or different from those of other slots in the TRS burst. For instance, with X=2, the symbols with TRS are different in two consecutive slots and thus misdetection on Doppler spread estimation may be avoided when the actual Doppler spread is high. The concept is to shorten time span (that is, the distance between a second TRS symbol in a first slot and a first TRS symbol in a second slot) in order to exchange for wider resolvable range. When the TRS symbol number is greater than or equal to 2 in a slot of a TRS burst, frequency offset estimation may be performed by extracting a phase difference between TRS resource elements (REs) in two TRS symbols in a slot. Value of the estimated frequency offset may be compensated in pre-Fast Fourier Transform (pre-FFT) in a subsequent slot.

Under the proposed scheme, when the total TRS symbols in all the slots of a TRS burst is greater than or equal to 3, Doppler spread estimation may be performed by a method described below. According to the method, with X slots in a TRS burst and the number of TRS symbols in each slot being $N_1, N_2 \ldots N_X$, it is not necessary for the values of $N_1, N_2 \ldots N_X$ to be identical. The estimated channel value on a certain TRS RE may be performed in time domain of post-FFT by linear combination on the raw values of other $N_1 + N_2 + \ldots + N_X - 1$ TRS REs at the same subcarrier. The method may utilize the weighting coefficients for linear combination to control the bandwidth of an interpolation in the time domain of post-FFT. The method may also subtract the raw value on a certain TRS RE from the estimated channel value to obtain an interpolation error. Different sets of the weighting coefficients for different bandwidths of the interpolation may be applied to observe the interpolation error from different bandwidths of the interpolation. A larger value of the interpolation error may indicate that the bandwidth of the interpolation does not fit in the actual Doppler spread.

Under the proposed scheme, a TRS pattern in the time domain in a TRS burst may be a non-uniformly, non-equally spaced structure. With the number of total TRS symbols in all the slots of a TRS burst being denoted by $N_{total}$, there may be $N_{total} - 1$ values of symbol spacing between two neighboring TRS symbols. With the values of symbols spacing being denoted by $S_{t1}, S_{t2} \ldots S_{t(Ntotal-1)}$, it is not necessary for the values of $S_{t1}, S_{t2} \ldots S_{t(Ntotal-1)}$ to be identical.

Under the proposed scheme, slot format as well as other reference signals, such as demodulation reference signal (DMRS), channel state information reference signal (CSI-RS) and phase tracking reference signal (PT-RS), may need to be considered with respect to TRS location/position in OFDM symbols. In NR networks, DMRS may occupy all the REs on the occupied OFDM symbols of the resource block. Accordingly, TRS may not be frequency-division multiplexed with DMRS in the same OFDM symbol. Instead, TRS may be time-division multiplexed with DMRS. On the other hand, TRS may be frequency multiplexed with NR CSI-RS in the same OFDM symbol. Additionally, TRS may not appear at a control channel region.

Under the proposed scheme, symbol spacing between two TRS symbols for the purpose of frequency offset estimation may be greater than or equal to 3 (>=3). In one approach, among all the TRS symbols in a slot, two adjacent TRS symbols may be utilized for frequency offset estimation. For example, with four TRS symbols (e.g., symbol 1, symbol 2, symbol 3 and symbol 4), the pair of symbol 1 and symbol 2 or the pair of symbol 3 and symbol 4 may be utilized for frequency offset estimation. In another approach, among all the TRS symbols in a slot, two non-adjacent TRS symbols may be utilized for frequency offset estimation when there is a limited number of slots in a TRS burst or when TRS placement is limited to other RS positions. For example, with four TRS symbols (e.g., symbol 1, symbol 2, symbol 3 and symbol 4), the pair of symbol 1 and symbol 3 or the pair of symbol 2 and symbol 4 may be utilized for frequency offset estimation.

Under the proposed scheme, a TRS pattern in the time domain may be different when applying to different subcarrier spacing. For example, for above-6 GHz frequency bands, phase noise effect tends to be more significant. When the phase noise effect is more significant, the larger TRS symbol spacing may be preferred for frequency offset estimation. This is because the larger phase difference between the two TRS symbols utilized for frequency offset estimation indicates an increased signal-to-noise ratio (SNR) before entering a loop filter.

Under the proposed scheme, any of the several proposed configurations listed below may be feasible for implementation in a NR network. Characteristics and design principles of at least some of these configurations are also described below.

1) $X=2$, $N_1=2$, $N_2=2$
2) $X=2$, $N_1=3$, $N_2=1$
3) $X=2$, $N_1=3$, $N_2=2$
4) $X=2$, $N_2=1$, $N_2=1$
5) $X=1$, $N_1 4$
6) $X=1$, $N_1=3$
7) $X=1$, $N_1=2$

For the configuration of $X=2$, $N_1=2$, $N_2=2$, one characteristic is that $N_{total}=4$. The four TRS symbols may be represented by TRS 1, TRS 2, TRS 3 and TRS 4. Another characteristic is that there are three possible values of symbol spacing ($S_{t1}$, $S_{t2}$ and $S_{t3}$) between two neighboring TRS symbols of the four TRS symbols. The symbol spacing value $S_{t1}$ may denote the symbol spacing between the first and second TRS symbols in a first slot of a TRS burst. The symbol spacing value $S_{t2}$ may denote the symbol spacing between the second TRS symbol in the first slot of the TRS burst and the first TRS symbol in a second slot of the TRS burst. The symbol spacing value $S_{t3}$ may denote the symbol spacing between the first and second TRS symbols in the second slot of the TRS burst.

A design principle for the configuration of $X=2$, $N_1=2$, $N_2=2$ may be that $S_{t2}>=S_{t3}>=S_{t1}$. In this configuration, $S_{t2}$ is a key parameter for controlling the resolution of Doppler spread estimation. That is, a larger value of $S_{t2}$ may improve the resolution with the cost of a reduced resolvable range. When $S_{t3}=S_{t1}$, the two slots in the TRS burst may have the same capability with respect to resolvable range and accuracy of frequency offset estimation. When $S_{t3}>S_{t1}$, the second slot in the TRS burst may have an increased accuracy in frequency offset estimation with the cost of a smaller resolvable range than that of the first slot. The resolvable range of the second slot may be reduced because the frequency offset may be compensated in the second slot by the estimated value from the first slot. When $S_{t2}>=S_{t3}>S_{t1}$, the resolvable range may be increased when a Doppler spread estimation is applied to estimate the channel value on the TRS RE of TRS 2. Moreover, the resolution may be increased when the Doppler spread estimation is applied to estimate the channel value on the TRS RE of TRS 3.

For the configuration of $X=1$, $N_1=2$, one characteristic is that $N_{total}=2$. The two TRS symbols may be represented by TRS 1 and TRS 2. Another characteristic is that there is one possible value of symbol spacing ($S_{t1}$) between the two neighboring TRS symbols. The symbol spacing value $S_{t1}$ may denote the symbol spacing between the first and second TRS symbols in a first slot of a TRS burst. A design principle for the configuration of $X=1$, $N_1=2$ may be that $S_{t1}>=3$. As an example of use case, when a short uplink/downlink (UL/DL) switching periodicity is applied to the slot structure, it may be feasible to have a tracking reference signal in a slot.

For the configuration of $X=2$, $N_1=1$, $N_2=1$, one characteristic is that $N_{total}=2$. The two TRS symbols may be represented by TRS 1 and TRS 2. Another characteristic is that there is one possible value of symbol spacing ($S_{t1}$) between the two neighboring TRS symbols. The symbol spacing value $S_{t1}$ may denote the symbol spacing between the first TRS symbol in a first slot of a TRS burst and the first TRS symbol in a second slot of the TRS burst. A design principle for the configuration of $X=2$, $N_1=1$, $N_2=1$ may be that $S_{t1}$ determines the accuracy of frequency offset estimation. When a phase noise effect is more significant, a larger TRS symbol spacing ($S_{t1}$) may be preferred for frequency offset estimation. This is because the larger phase difference between the two TRS symbols utilized for frequency offset estimation indicates an increased SNR before entering a loop filter. As an example of use case, $S_{t1}$ may be equal to 14 symbols for frequency offset estimation in frequency bands above 6 GHz.

For the configuration of $X=1$, $N_1=3$, one characteristic is that $N_{total}=3$. The three TRS symbols may be represented by TRS 1, TRS 2 and TRS 3. Another characteristic is that there are two possible values of symbol spacing ($S_{t1}$ and $S_{t2}$) between two neighboring TRS symbols of the three TRS symbols. The symbol spacing value $S_{t1}$ may denote the symbol spacing between the first and second TRS symbols in a first slot of a TRS burst. The symbol spacing value $S_{t2}$ may denote the symbol spacing between the second TRS symbol in the first slot of the TRS burst and the third TRS symbol in the first slot of the TRS burst. A design principle for the configuration of $X=1$, $N_1=3$ may be that each of $S_{t1}$ and $S_{t2}>=3$ and that it is not necessary for $S_{t1}$ and $S_{t2}$ to be equal. As an example of use case, when a short UL/DL switching periodicity is applied to the slot structure, it may be feasible to have a tracking reference signal in a slot.

For the configuration of $X=1$, $N_1=4$, one characteristic is that $N_{total}=4$. The four TRS symbols may be represented by TRS 1, TRS 2, TRS 3 and TRS 4. Another characteristic is that there are three possible values of symbol spacing ($S_{t1}$, $S_{t2}$ and $S_{t3}$) between two neighboring TRS symbols of the four TRS symbols. The symbol spacing value $S_{t1}$ may denote the symbol spacing between the first and second TRS symbols in a first slot of a TRS burst. The symbol spacing value $S_{t2}$ may denote the symbol spacing between the second and third TRS symbols in the first slot of the TRS burst. The symbol spacing value $S_{t3}$ may denote the symbol spacing between the third and fourth TRS symbols in the first slot of the TRS burst.

A design principle for the configuration of $X=1$, $N_1=4$ may be that the feature of $S_{t1}=S_{t3}$ may be chosen. For example, TRS 1 and TRS 2 may be grouped as a pair and TRS 3 and TRS 4 may be grouped as another pair. Frequency offset estimation may be performed by using these two pairs. The two pairs may be in the same slot. Therefore, it may be better for the two pairs to have the same capability in terms of resolvable tracking range. When TRS 1 and TRS 2 are in a pair, it may be less preferable to group TRS 2 and TRS 3 as another group in lieu of grouping TRS 3 and TRS 4 as a pair. This is because when TRS 2 appears in two pairs the resultant diversity gain may be reduced. As another example, TRS 1 and TRS 3 may be grouped as a pair and TRS 2 and TRS 4 may be grouped as another pair. Again, frequency offset estimation may be performed by using these two pairs.

Another design principle for the configuration of X=1, $N_1$=4 may be that the value of $S_{t2}$ may depend on $S_{t1}$ and $S_{t3}$. This is because the number of OFDM symbols for data transmission may be more limited this way. For example, by considering two symbols for control channel, there may be only 12 symbols available for data transmission. In any event, the following criterion should be met: $S_{t1}+S_{t2}+S_{t3}$=14—symbol number for control channel. As an example of use case, when a short UL/DL switching periodicity is applied to the slot structure, it may be feasible to have a tracking reference signal in a slot.

For the configuration of X=2, $N_1$=3, $N_2$=1, one characteristic is that $N_{total}$=4. The four TRS symbols may be represented by TRS 1, TRS 2, TRS 3 and TRS 4. Another characteristic is that there are three possible values of symbol spacing ($S_{t1}$, $S_{t2}$ and $S_{t3}$) between two neighboring TRS symbols of the four TRS symbols. The symbol spacing value $S_{t1}$ may denote the symbol spacing between the first and second TRS symbols in a first slot of a TRS burst. The symbol spacing value $S_{t2}$ may denote the symbol spacing between the second and third TRS symbols in the first slot of the TRS burst. The symbol spacing value $S_{t3}$ may denote the symbol spacing between the third TRS symbol in the first slot of the TRS burst and the first TRS symbol in a second slot of the TRS burst.

A design principle for the configuration of X=2, $N_1$=3, $N_2$=1 may be that $S_{t1}=S_{t2}<=S_{t3}$. In the first slot of the TRS burst, TRS 1, TRS 2 and TRS 3 may be used for frequency offset estimation by extracting a respective phase difference between TRS 1 and TRS 2 and between TRS 2 and TRS 3. The estimated value may be compensated in the second slot of the TRS burst. A phase de-rotation may be applied on TRS 3 to align a residual frequency offset seen by TRS 3 and TRS 4, and frequency offset estimation may be performed using TRS 3 and TRS 3. The accuracy of frequency offset estimation may be improved when $S_{t3}$ is larger. The resolvable range may be increased when a Doppler spread estimation is applied to estimate the channel value on the TRS RE of TRS 2. Moreover, the resolution may be increased when the Doppler spread estimation is applied to estimate the channel value on the TRS RE of TRS 3.

Illustrative Implementations

Figure 1:
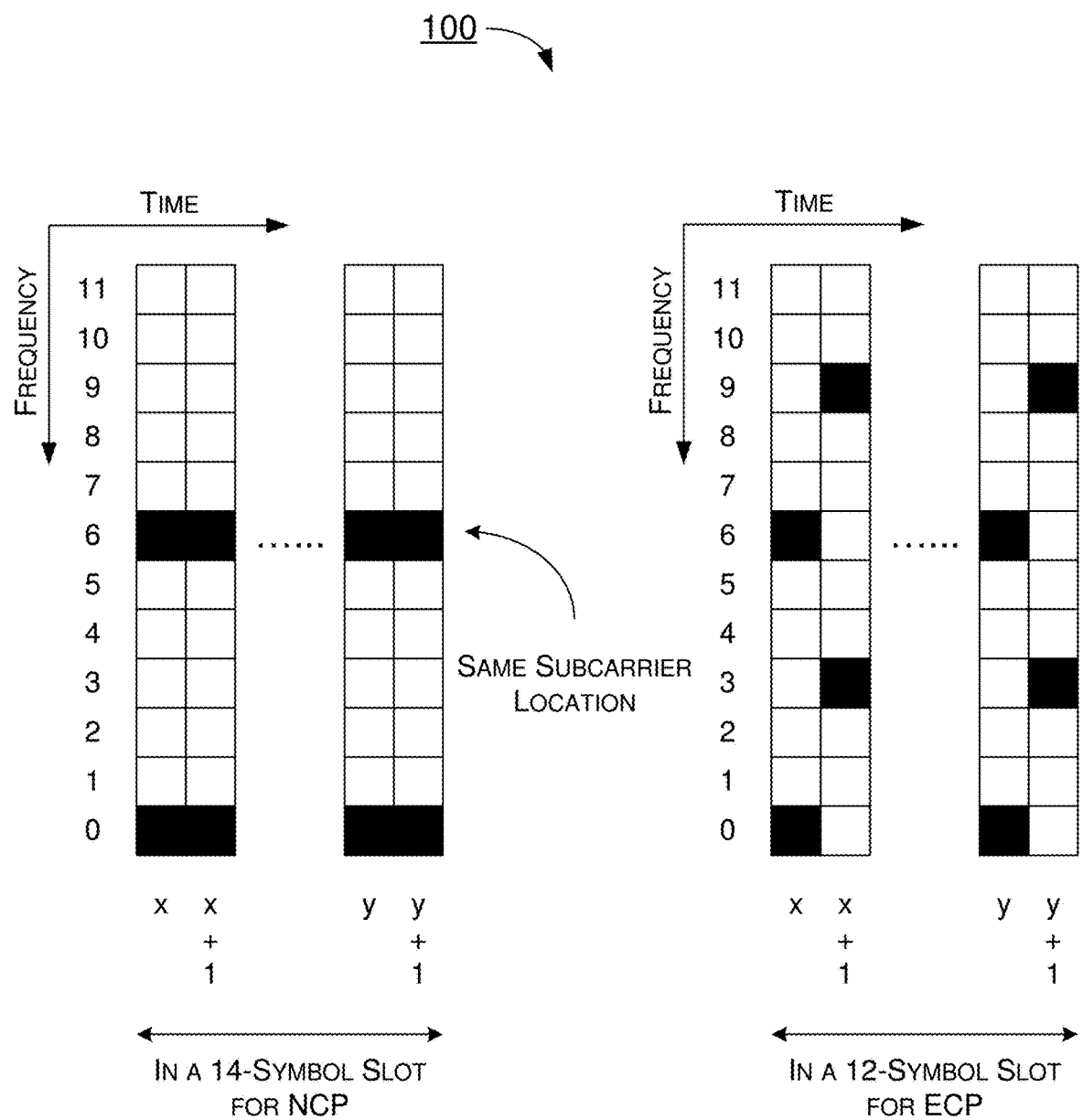
FIG. 1 is a diagram of an example scenario in accordance with an implementation of the present disclosure.

FIG. 1 illustrates an example scenario 100 in accordance with an implementation of the present disclosure. In scenario 100, under the proposed scheme, a TRS may occupy eight REs in one physical resource block (PRB) in four CSI-RS OFDM symbols. The density is eight REs per port per PRB (8 REs/port/PRB). In scenario 100 as well as the following example scenarios, M may denote the number of adjacent REs in the frequency domain, N may denote the number of adjacent REs in the time domain, and P may denote the number of ports. Accordingly, for normal cyclic prefix (NCP) cases, P=1 and (M, N)=(1, 2) as a pair for TRS. There are four pairs in one PRB.

In some implementations, the periodicity of the TRS may be different from that of CSI-RS. In some implementations, the bandwidth of the TRS may be the same as the system bandwidth. Alternatively, the bandwidth of the TRS may occupy $2^n$ PRBs, which may be symmetric from direct current (DC), such that FFT/Inverse Fast Fourier Transform (IFFT) operation may be facilitated. In scenario 100, the TRS may be received through one and the same antenna port at a UE. For extended cyclic prefix (ECP) cases, the TRS may be of a staggered form so that the range of +/−2*NCP length may be observed. In the example shown in FIG. 1, locations of the OFDM symbols with TRS are shown in darkened blocks. In this example, the OFDM symbols with TRS occupy the same subcarrier in a 14-symbol slot for NCP.

Figure 2:
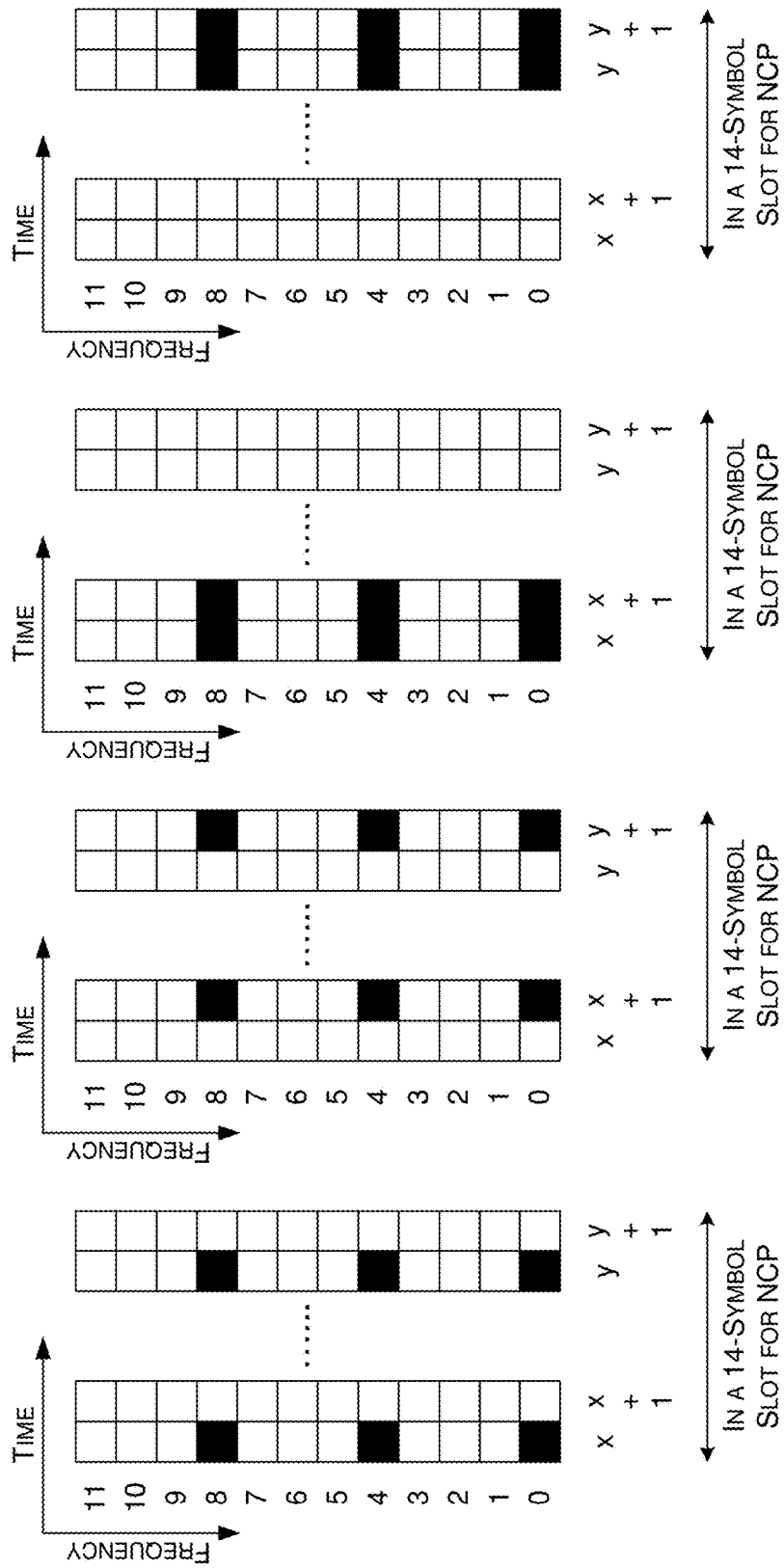
FIG. 2 is a diagram of an example scenario in accordance with an implementation of the present disclosure.

FIG. 2 illustrates an example scenario 200 in accordance with an implementation of the present disclosure. In scenario 200, under the proposed scheme, a TRS may be located at two of CSI-RS symbols. The TRS may be used for time delay estimation, delay spread estimation and frequency offset estimation. In scenario 200, (M, N)=(1, 1) or (1, 2). When (M, N)=(1, 1), TRS may be at symbol x and symbol y or, alternatively, at symbol x+1 and symbol y+1. For example, when (M, N)=(1, 1), TRS may be at symbol 4 and symbol 8, at symbol 5 and symbol 9, or at symbol 6 and symbol 10. When (M, N)=(1, 2), TRS may be at symbol x and symbol x+1 or, alternatively, at symbol y and symbol y+1. In scenario 200, the TRS may be received through one and the same antenna port at a UE.

As an example, the TRS subcarrier spacing may be 6, and the TRS may be located at resource element k and resource element k+6, with k=0~5 in 12 subcarriers. As another example, the TRS subcarrier spacing may be 4 for increased density, and the TRS may be located at resource element k, resource element k+4 and resource element k+8, with k=0~3 in 12 subcarriers. The other REs in the CSI-RS symbols not being occupied by TRS may be allocated for acquisition or data. Referring to FIG. 2, when TRS is located at two CSI-RS symbols, the TRS with 6 REs/port/PRB may be allocated as those shown in FIG. 2.

Figure 3:
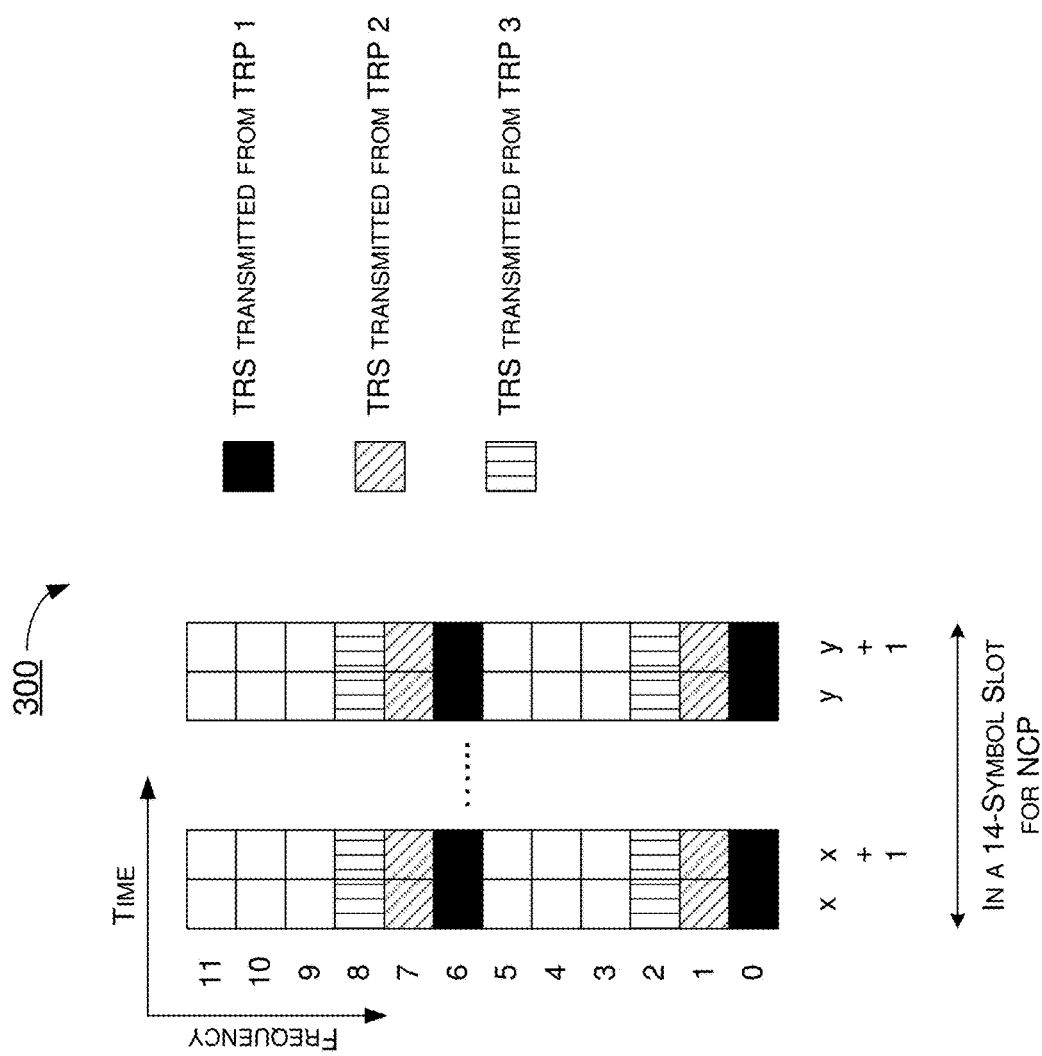
FIG. 3 is a diagram of an example scenario in accordance with an implementation of the present disclosure.

FIG. 3 illustrates an example scenario 300 in accordance with an implementation of the present disclosure. In scenario 300, under the proposed scheme, TRS received by a UE from different base stations (e.g., transmit/receive points (TRPs) in an NR network) may be transmitted at the same slot, as non-overlapping at the RE level for TRS may be scheduled. Moreover, for protection purpose, zero-power (ZP) CSI-RS may also be scheduled from a base station m when TRS is scheduled from a base station n at the same RE. Alternatively, under the proposed scheme, TRS from different base stations may be allocated at different slots and non-overlapping at the slot level. For protection purpose, ZP CSI-RS may also be scheduled from a base station m when TRS is scheduled from a base station n at the same RE. In the example shown in FIG. 3, there may be TRS transmitted from a first base station (e.g., TRP 1), TRS transmitted from a second base station (e.g., TRP 2), and TRS transmitted from a third base station (e.g., TRP 3).

FIG. 4 illustrates an example scenario 400 in accordance with an implementation of the present disclosure. In scenario 400, under the proposed scheme, other reference signals, such as DMRS, CSI-RS and PT-RS, may need to be considered with respect to TRS location/position in OFDM symbols. In NR networks, DMRS may occupy all the REs on the occupied OFDM symbols of the resource block. Accordingly, TRS may not be frequency-division multiplexed with DMRS in the same OFDM symbol. Instead, TRS and DMRS may be time-division multiplexed.

In some implementations, the last symbol with TRS in a slot may not be later than the last symbol with DMRS plus 1. For example, with x being the last symbol with DMRS, the last symbol with TRS may not be located before x+2. Additionally, the symbol with TRS may be as far ahead as possible in a slot. In some implementations, TRS may be frequency multiplexed with NR CSI-RS in the same OFDM symbol. Additionally, TRS may not appear at a control channel region. When PT-RS is configured, TRS may not be configured.

In scenario 400, the TRS symbol spacing within a slot ($S_t$) may be non-uniform as the number of TRS symbols (N) is 4. There are three gaps when N=4 in a slot, and thus for non-uniform spacing two spacing values on the three gaps may be allowed. For N=2, $S_t$ may be >=3. In the example shown in FIG. 4, with DMRS occupying symbols 2, 3, 4, 7, 10 and 11, TRS may occupy two symbols in a 14-symbol slot such as, for example and without limitation, symbols 5 and 12, symbols 5 and 9, or symbols 5 and 8.

FIG. 5 illustrates an example scenario 500 in accordance with an implementation of the present disclosure. In scenario 500, under the proposed scheme, with DMRS occupying symbols 2, 3, 7, 10 and 11, TRS may occupy two symbols in a 14-symbol slot such as, for example and without limitation, symbols 5 and 12, symbols 4 and 8, symbols 5 and 9, or symbols 4 and 9.

FIG. 6 illustrates an example scenario 600 in accordance with an implementation of the present disclosure. In scenario 600, under the proposed scheme, with DMRS occupying symbols 2, 3, 4, 7 and 11, TRS may occupy two symbols in a 14-symbol slot such as, for example and without limitation, symbols 5 and 12, symbols 5 and 10, symbols 5 and 9, or symbols 5 and 8.

FIG. 7 illustrates an example scenario 700 in accordance with an implementation of the present disclosure. In scenario 700, under the proposed scheme, with DMRS occupying symbols 2, 3, 4, 5, 8 and 11, TRS may occupy two symbols in a 14-symbol slot such as, for example and without limitation, symbols 6 and 12, symbols 6 and 10, or symbols 6 and 9.

Figure 8:
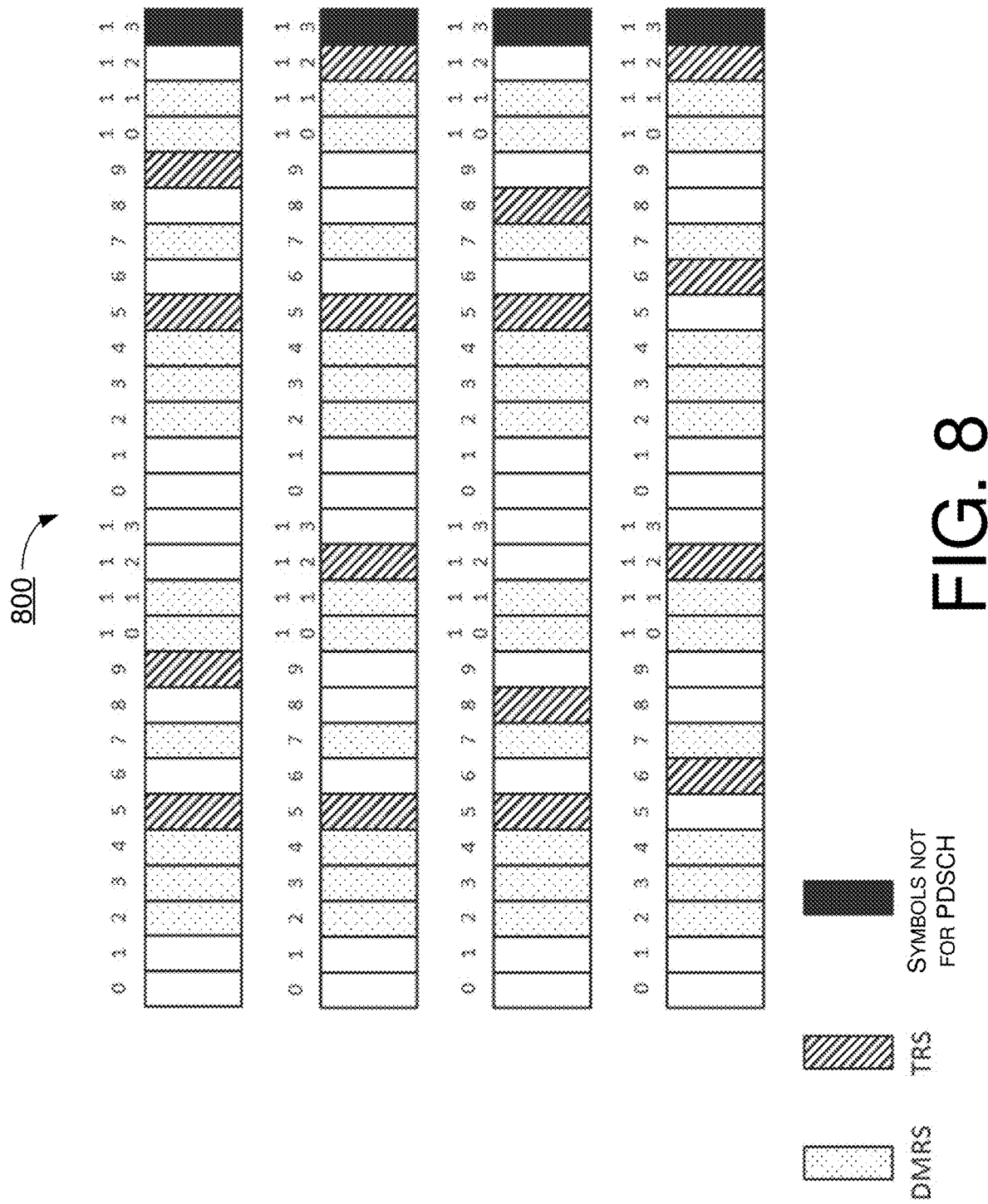
FIG. 8 is a diagram of an example scenario in accordance with an implementation of the present disclosure.

FIG. 8 illustrates an example scenario 800 in accordance with an implementation of the present disclosure. In scenario 800, under the proposed scheme, TRS may occupy two OFDM symbols in one slot and four OFDM symbols in two consecutive slots. In the example shown in FIG. 8, for the slot type of 13- or 14-DL OFDM symbols, TRS may occupy symbols 5 and 9, symbols 5 and 12, symbols 5 and 8, or symbols 6 and 12 in two consecutive slots. It is noteworthy that a pattern of TRS in the time domain may be different when applied to different subcarrier spacings. Moreover, Doppler spread estimation may be feasible for the non-uniformly spaced symbols with TRS, for example and without limitation, for a case in which X=2 and N=2 or 4 or another case in which X=1 and N=4.

Figure 9:
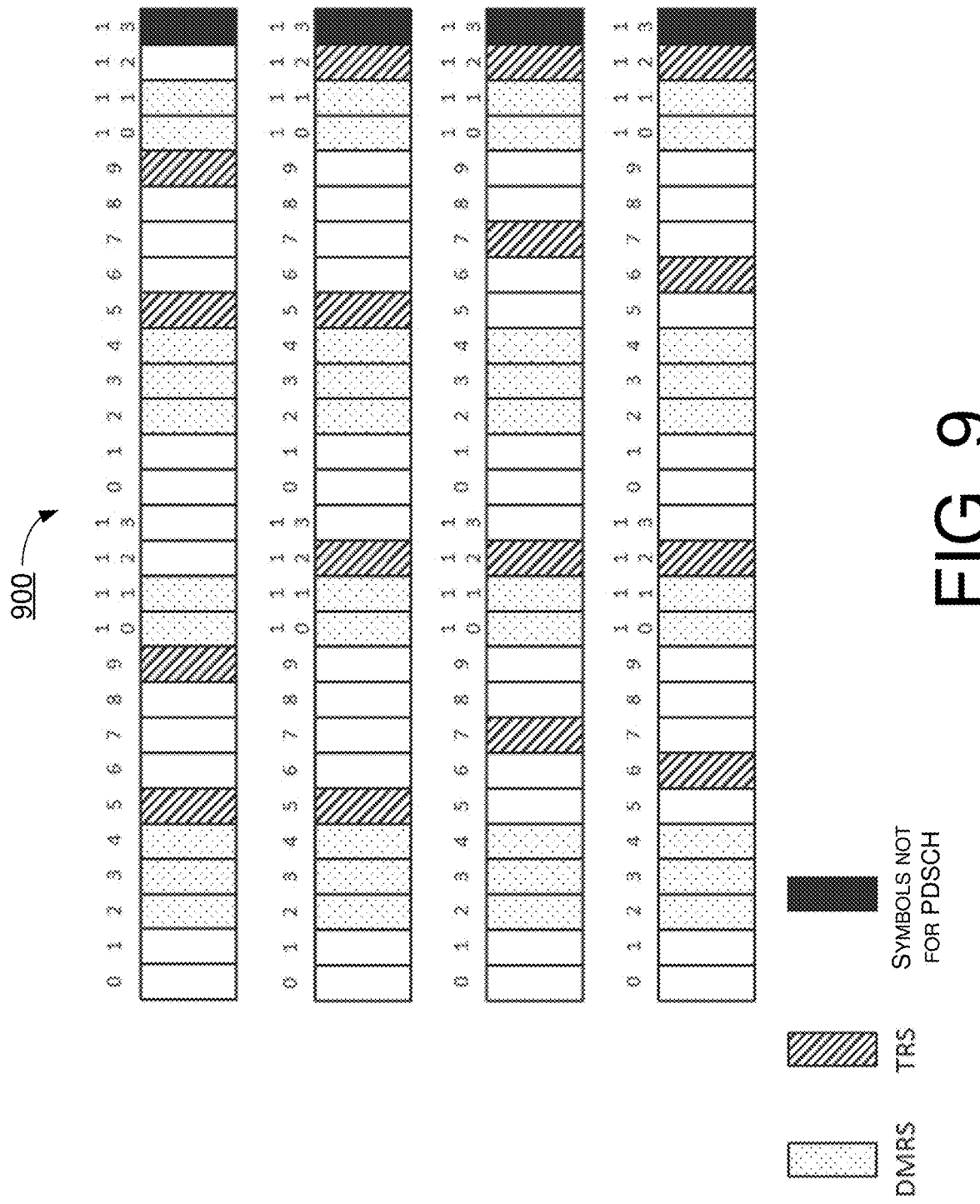
FIG. 9 is a diagram of an example scenario in accordance with an implementation of the present disclosure.

FIG. 9 illustrates an example scenario 900 in accordance with an implementation of the present disclosure. In scenario 900, under the proposed scheme, TRS may occupy two OFDM symbols in one slot and four OFDM symbols in two consecutive slots. In the example shown in FIG. 9, for the slot type of 13- or 14-DL OFDM symbols, TRS may occupy symbols 5 and 9, symbols 5 and 12, symbols 7 and 12, or symbols 6 and 12 in two consecutive slots. It is noteworthy that a pattern of TRS in the time domain may be different when applied to different subcarrier spacings. Moreover, Doppler spread estimation may be feasible for the non-uniformly spaced symbols with TRS, for example and without limitation, for a case in which X=2 and N=2 or 4 or another case in which X=1 and N=4.

Figure 10:
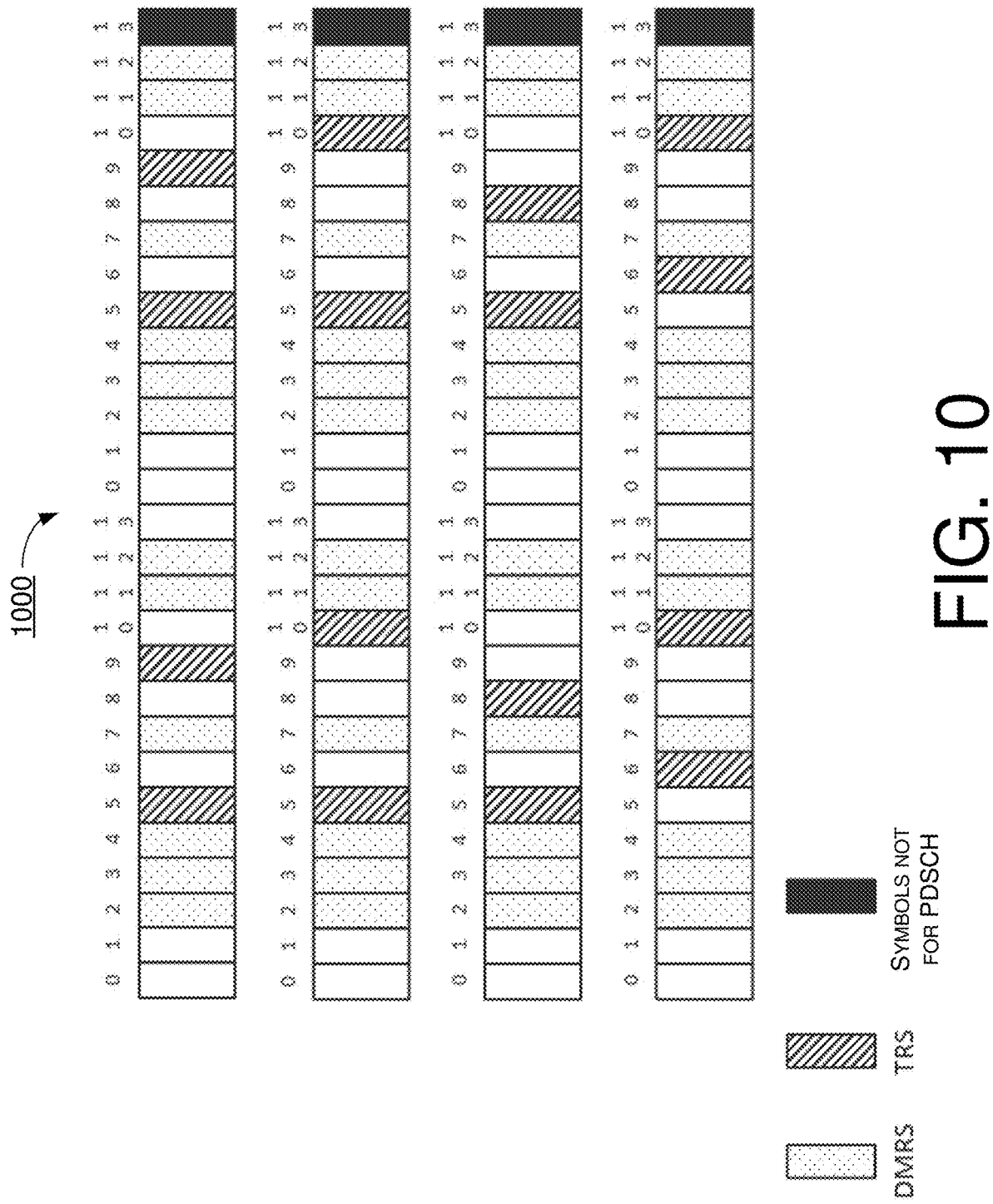
FIG. 10 is a diagram of an example scenario in accordance with an implementation of the present disclosure.

FIG. 10 illustrates an example scenario 1000 in accordance with an implementation of the present disclosure. In scenario 1000, under the proposed scheme, TRS may occupy two OFDM symbols in one slot and four OFDM symbols in two consecutive slots. In the example shown in FIG. 10, for the slot type of 13- or 14-DL OFDM symbols, TRS may occupy symbols 5 and 9, symbols 5 and 10, symbols 5 and 8, or symbols 6 and 10 in two consecutive slots. It is noteworthy that a pattern of TRS in the time domain may be different when applied to different subcarrier spacings. Moreover, Doppler spread estimation may be feasible for the non-uniformly spaced symbols with TRS, for example and without limitation, for a case in which X=2 and N=2 or 4 or another case in which X=1 and N=4.

Figure 11:
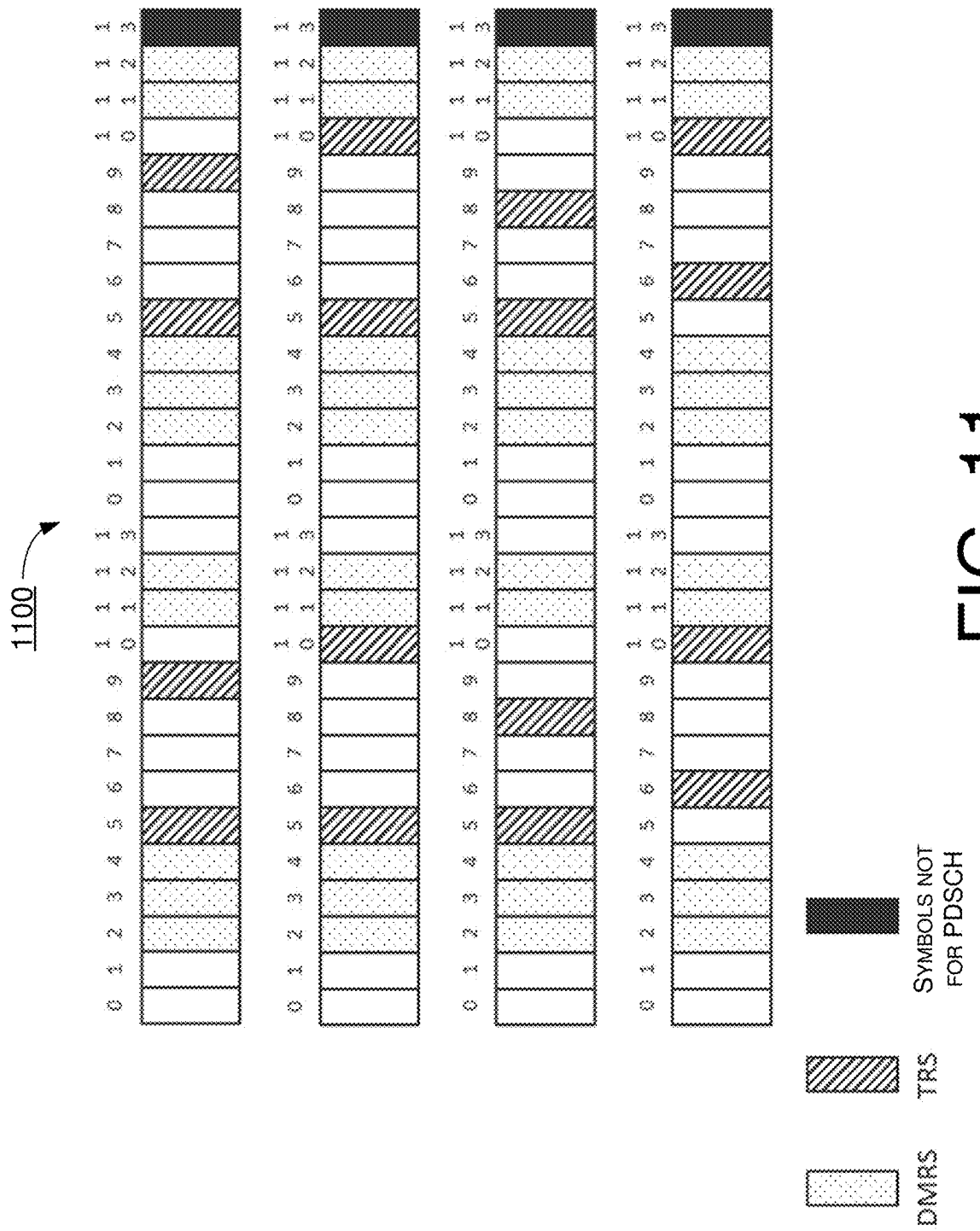
FIG. 11 is a diagram of an example scenario in accordance with an implementation of the present disclosure.

FIG. 11 illustrates an example scenario 1100 in accordance with an implementation of the present disclosure. In scenario 1100, under the proposed scheme, TRS may occupy two OFDM symbols in one slot and four OFDM symbols in two consecutive slots. In the example shown in FIG. 11, for the slot type of 13- or 14-DL OFDM symbols, TRS may occupy symbols 5 and 9, symbols 5 and 10, symbols 5 and 8, or symbols 6 and 10 in two consecutive slots. It is noteworthy that a pattern of TRS in the time domain may be different when applied to different subcarrier spacings. Moreover, Doppler spread estimation may be feasible for the non-uniformly spaced symbols with TRS, for example and without limitation, for a case in which X=2 and N=2 or 4 or another case in which X=1 and N=4.

Figure 12:
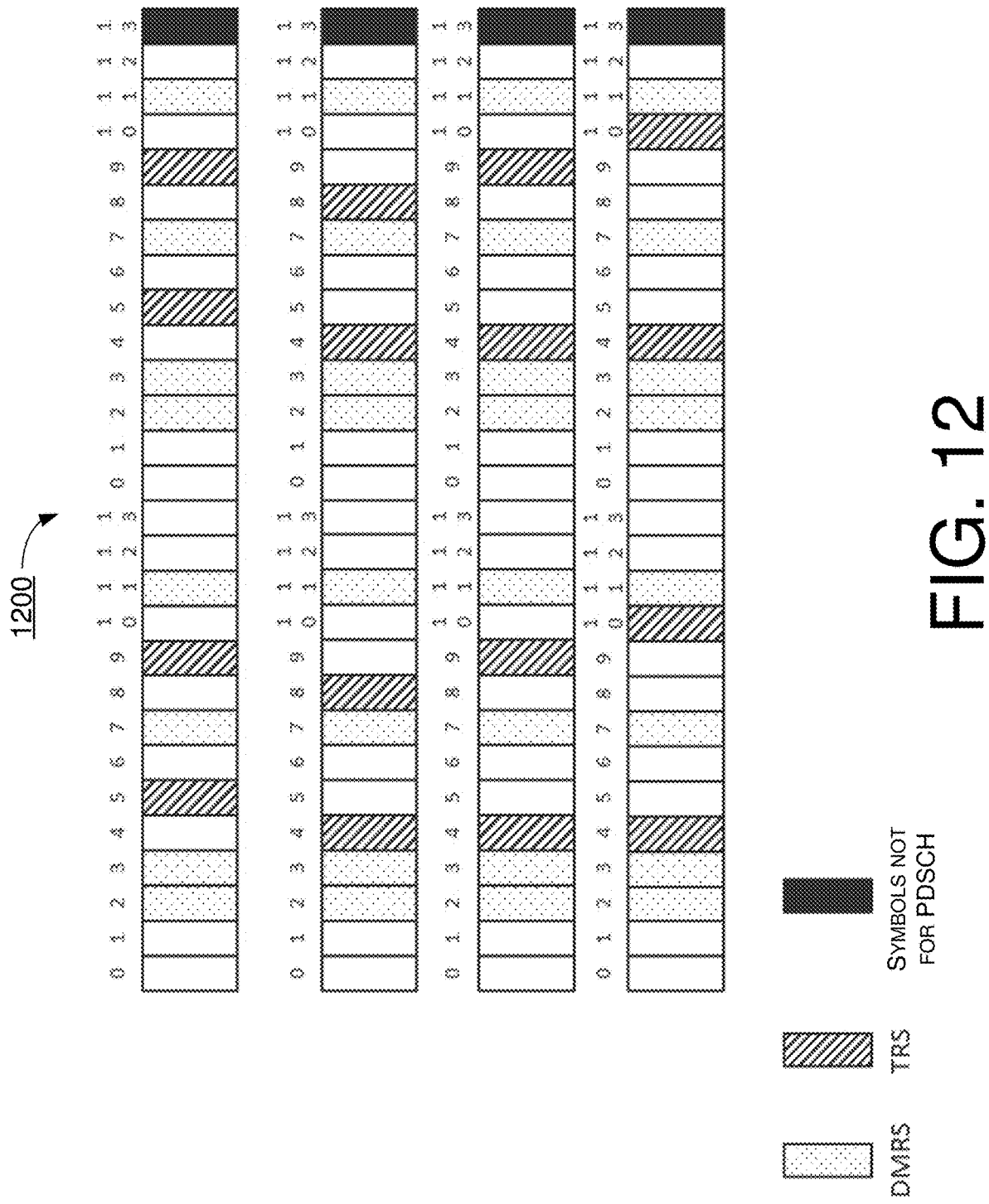
FIG. 12 is a diagram of an example scenario in accordance with an implementation of the present disclosure.

FIG. 12 illustrates an example scenario 1200 in accordance with an implementation of the present disclosure. In scenario 1200, under the proposed scheme, TRS may occupy two OFDM symbols in one slot and four OFDM symbols in two consecutive slots. In the example shown in FIG. 11, for the slot type of 13- or 14-DL OFDM symbols and for a high-speed scenario, TRS may occupy symbols 5 and 9, symbols 4 and 8, symbols 4 and 9, or symbols 4 and 10 in two consecutive slots. It is noteworthy that a pattern of TRS in the time domain may be different when applied to different subcarrier spacings. Moreover, Doppler spread estimation may be feasible for the non-uniformly spaced symbols with TRS, for example and without limitation, for a case in which X=2 and N=2 or 4 or another case in which X=1 and N=4.

Illustrative System

Figure 13:
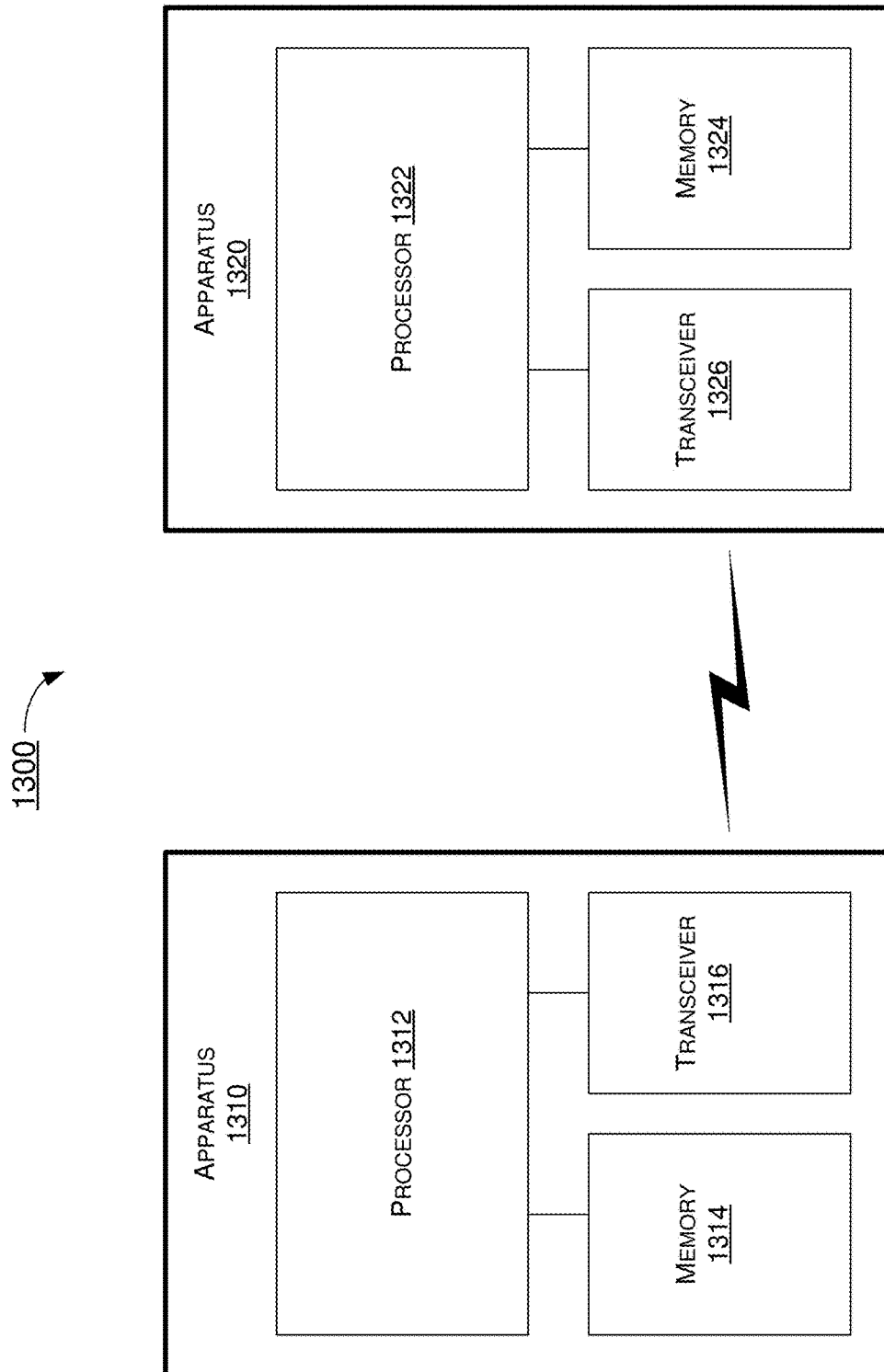
FIG. 13 is a block diagram of an example system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to tracking reference signal and framework thereof in mobile communications, including the various schemes described above with respect to various proposed designs, concepts, schemes, systems and methods described above as well as processes 400, 500 and 600 described below.

Each of apparatus 1310 and apparatus 1320 may be a part of an electronic apparatus, which may be a network apparatus or a UE, such as a portable or mobile apparatus, a wearable apparatus, a wireless communication apparatus or a computing apparatus. For instance, each of apparatus 1310 and apparatus 1320 may be implemented in a smartphone, a smartwatch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in an eNodeB in an LTE, LTE-Advanced or LTE-Advanced Pro network or in a gNB or TRP in a 5G network, an NR network or an IoT network.

In some implementations, each of apparatus 1310 and apparatus 1320 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 1310 and apparatus 1320 may be implemented in or as a network apparatus or a UE. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to tracking reference signal and framework thereof in mobile communications in accordance with various implementations of the present disclosure.

In some implementations, apparatus 1310 may also include a transceiver 1316 coupled to processor 1312. Transceiver 1316 may be capable of wirelessly transmitting and receiving data. In some implementations, apparatus 1320 may also include a transceiver 1326 coupled to processor 1322. Transceiver 1326 may include a transceiver capable of wirelessly transmitting and receiving data.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

For illustrative purposes and without limitation, a description of capabilities of apparatus 1310, as a UE, and apparatus 1320, as a base station of a network (e.g., an NR network), is provided below.

In some implementations, processor 1312 may receive from apparatus 1320, via transceiver 1316, a reference signal via a communication link between apparatus 1310 and apparatus 1320. The reference signal may contain resource configuration with respect to TRS configuration. Processor 1312 may also receive from apparatus 1320, via transceiver 1316, a TRS burst containing a plurality of TRS symbols with one or more components of the UE configured according to the TRS configuration. Processor 1312 may further process the TRS burst to perform channel estimation, synchronization, time tracking, frequency tracking, or a combination thereof.

In some implementations, the channel estimation may include one or more of time delay estimation, delay spread estimation, frequency offset estimation, and Doppler spread estimation.

In some implementations, a symbol spacing between two neighboring TRS symbols in the TRS burst may be greater than or equal to 3 symbols. In some implementations, in receiving the TRS burst, processor 1312 may receive the plurality of TRS symbols of the TRS burst through one and the same antenna port of apparatus 1310. In some implementations, the plurality of TRS symbols may occupy a same subcarrier location.

In some implementations, in processing the TRS burst to perform the channel estimation, processor 1312 may perform frequency offset estimation using two TRS symbols that are adjacent among the plurality of TRS symbols in the TRS burst. Alternatively, in processing the TRS burst to perform the channel estimation, processor 1312 may perform frequency offset estimation using two TRS symbols that are non-adjacent among the plurality of TRS symbols in the TRS burst.

In some implementations, a pattern of the plurality of TRS symbols in the TRS burst may be non-uniform.

In some implementations, the TRS configuration may define a plurality of parameters including the following: (1) X=a length of the TRS burst in terms of a number of 14-symbol slots; (2) Y=a periodicity of the TRS burst; (3) N=a number of OFDM symbols occupied by one or more TRS symbol of the plurality of TRS symbols within each slot; (4) B=a TRS bandwidth in terms of a number of RBs; (5) $S_f$=a TRS subcarrier spacing in a frequency domain; and (6) $S_t$=a TRS symbol spacing between two neighboring TRS symbols of the plurality of TRS symbols in a time domain.

In some implementations, N=2, and there are fourteen OFDM symbols within each slot as denoted by symbol 0, symbol 1, symbol 2, symbol 3, symbol 4, symbol 5, symbol 6, symbol 7, symbol 8, symbol 9, symbol 10, symbol 11, symbol 12 and symbol 13. Moreover, two of the fourteen OFDM symbols used for TRS may include a pair of symbol 4 and symbol 8, a pair of symbol 5 and symbol 9, or a pair of symbol 6 and symbol 10.

In some implementations, for the TRS burst, X=2, $N_1$=2 for a first slot of the TRS burst, $N_2$=2 for a second slot of the TRS burst, and there are four TRS symbols in the TRS burst ($N_{total}$=4). Additionally, $S_{t1}$ may denote a symbol spacing between a first TRS symbol in the first slot and a second TRS symbol in the first slot, $S_{t2}$ may denote a symbol spacing between the second TRS symbol in the first slot and a first TRS symbol in the second slot, and $S_{t3}$ may denote a symbol spacing between the first TRS symbol in the second slot and a second TRS symbol in the second slot. In some implementations, $S_{t2}$ may be greater than or equal to $S_{t3}$ which may be greater than or equal to $S_{t1}$ ($S_{t2}>=S_{t3}>=S_{t1}$). In some implementations, $S_{t3}=S_{t1}$. Alternatively, $S_{t3}>$St1. Still alternatively, $S_{t2}>=S_{t3}>S_{t1}$.

In some implementations, for the TRS burst, X=1, $N_1$=2 for a first slot of the TRS burst and there are two TRS symbols in the TRS burst ($N_{total}$=2). Moreover, $S_{t1}$ may denote a symbol spacing between a first TRS symbol in the first slot and a second TRS symbol in the first slot. In some implementations, $S_{t1}>=3$.

In some implementations, in receiving the reference signal, processor 1312 may receive a CSI-RS through a radio resource control (RRC) connection via the communication link.

Illustrative Processes

FIG. 14 illustrates an example process 1400 in accordance with an implementation of the present disclosure. Process 1400 may represent an aspect of implementing tracking reference signal and framework thereof in mobile communications, including the various schemes described above with respect to various proposed designs, concepts, schemes, systems and methods described above. More specifically, process 1400 may represent an aspect of the proposed concepts and schemes pertaining to tracking reference signal and framework thereof in mobile communications. Process 1400 may include one or more operations, actions, or functions as illustrated by one or more of blocks 1410, 1420 and 1430. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. The blocks/sub-blocks of process 1400 may be executed iteratively. Process 1400 may be implemented by or in apparatus 1310 and apparatus 1320 as well as any variations thereof. Solely for illustrative purposes and without limiting the scope, process 1400 is described below in the context of apparatus 1310 as a UE and apparatus 1320 as a base station. Process 1400 may begin at block 1410.

At 1410, process 1400 may involve processor 1312 receiving from apparatus 1320, via transceiver 1316, a reference signal via a communication link between apparatus 1310 and apparatus 1320. The reference signal may contain resource configuration with respect to TRS configuration. Process 1400 may proceed from 1410 to 1420.

At 1420, process 1400 may involve processor 1312 receiving from apparatus 1320, via transceiver 1316, a TRS burst containing a plurality of TRS symbols with one or more components of the UE configured according to the TRS configuration. Process 1400 may proceed from 1420 to 1430.

At 1430, process 1400 may involve processor 1312 processing the TRS burst to perform channel estimation, synchronization, time tracking, frequency tracking, or a combination thereof.

In some implementations, the channel estimation may include one or more of time delay estimation, delay spread estimation, frequency offset estimation, and Doppler spread estimation.

In some implementations, a symbol spacing between two neighboring TRS symbols in the TRS burst may be greater than or equal to 3 symbols. In some implementations, in receiving the TRS burst, process 1400 may involve processor 1312 receiving the plurality of TRS symbols of the TRS burst through one and the same antenna port of apparatus 1310. In some implementations, the plurality of TRS symbols may occupy a same subcarrier location.

In some implementations, in processing the TRS burst to perform the channel estimation, process 1400 may involve processor 1312 performing frequency offset estimation using two TRS symbols that are adjacent among the plurality of TRS symbols in the TRS burst. Alternatively, in processing the TRS burst to perform the channel estimation, process 1400 may involve processor 1312 performing frequency offset estimation using two TRS symbols that are non-adjacent among the plurality of TRS symbols in the TRS burst.

In some implementations, a pattern of the plurality of TRS symbols in the TRS burst may be non-uniform.

In some implementations, the TRS configuration may define a plurality of parameters including the following: (1) X=a length of the TRS burst in terms of a number of 14-symbol slots; (2) Y=a periodicity of the TRS burst; (3) N=a number of OFDM symbols occupied by one or more TRS symbol of the plurality of TRS symbols within each slot; (4) B=a TRS bandwidth in terms of a number of RBs; (5) $S_f$=a TRS subcarrier spacing in a frequency domain; and (6) $S_t$=a TRS symbol spacing between two neighboring TRS symbols of the plurality of TRS symbols in a time domain.

In some implementations, N=2, and there are fourteen OFDM symbols within each slot as denoted by symbol 0, symbol 1, symbol 2, symbol 3, symbol 4, symbol 5, symbol 6, symbol 7, symbol 8, symbol 9, symbol 10, symbol 11, symbol 12 and symbol 13. Moreover, two of the fourteen OFDM symbols used for TRS may include a pair of symbol 4 and symbol 8, a pair of symbol 5 and symbol 9, or a pair of symbol 6 and symbol 10.

In some implementations, for the TRS burst, X=2, $N_1$=2 for a first slot of the TRS burst, $N_2$=2 for a second slot of the TRS burst, and there are four TRS symbols in the TRS burst ($N_{total}$=4). Additionally, $S_{t1}$ may denote a symbol spacing between a first TRS symbol in the first slot and a second TRS symbol in the first slot, $S_{t2}$ may denote a symbol spacing between the second TRS symbol in the first slot and a first TRS symbol in the second slot, and $S_{t3}$ may denote a symbol spacing between the first TRS symbol in the second slot and a second TRS symbol in the second slot. In some implementations, $S_{t2}$ may be greater than or equal to $S_{t3}$ which may be greater than or equal to $S_{t1}$ ($S_{t2}>=S_{t3}>=S_{t1}$). In some implementations, $S_{t3}=S_{t1}$. Alternatively, $S_{t3}>$St1. Still alternatively, $S_{t2}>=S_{t3}>S_{t1}$.

In some implementations, for the TRS burst, X=1, $N_1$=2 for a first slot of the TRS burst and there are two TRS symbols in the TRS burst ($N_{total}$=2). Moreover, $S_{t1}$ may denote a symbol spacing between a first TRS symbol in the first slot and a second TRS symbol in the first slot. In some implementations, $S_{t1}>=3$.

In some implementations, in receiving the reference signal, process 1400 may involve processor 1312 receiving a CSI-RS through a radio resource control (RRC) connection via the communication link.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of a user equipment (UE) from a base station of a network, a reference signal via a communication link between the UE and the base station, the reference signal containing resource configuration with respect to tracking reference signal (TRS) configuration;
receiving, by the processor from the base station, a TRS burst containing a plurality of TRS symbols with one or more components of the UE configured according to the TRS configuration; and
processing, by the processor, the TRS burst to perform channel estimation, synchronization, time tracking, frequency tracking, or a combination thereof,
wherein, in an event that the channel estimation comprises frequency offset estimation, the processing of the TRS burst to perform the channel estimation comprises performing the frequency offset estimation by extracting a phase difference between TRS resource elements (REs) in two of the plurality of TRS symbols that are in a same slot.

2. The method of claim 1, wherein the channel estimation comprises one or more of time delay estimation, delay spread estimation, frequency offset estimation, and Doppler spread estimation.

3. The method of claim 1, wherein a symbol spacing between two neighboring TRS symbols in the TRS burst is greater than or equal to 3 symbols, wherein the receiving of the TRS burst comprises receiving the plurality of TRS symbols of the TRS burst through a same antenna port of the UE, and wherein the plurality of TRS symbols occupy a same subcarrier location.

4. The method of claim 1, wherein the processing of the TRS burst to perform the channel estimation comprises performing frequency offset estimation using two TRS symbols that are adjacent in a slot among the plurality of TRS symbols in the TRS burst.

5. The method of claim 1, wherein the processing of the TRS burst to perform the channel estimation comprises performing frequency offset estimation using two TRS symbols that are non-adjacent in a slot among the plurality of TRS symbols in the TRS burst.

6. The method of claim 1, wherein a pattern of the plurality of TRS symbols in the TRS burst is non-uniform.

7. The method of claim 1, wherein the TRS configuration defines a plurality of parameters comprising:
X=a length of the TRS burst in terms of a number of 14-symbol slots;
Y=a periodicity of the TRS burst;

N=a number of orthogonal frequency-division multiplexing (OFDM) symbols occupied by one or more TRS symbol of the plurality of TRS symbols within each slot;

B=a TRS bandwidth in terms of a number of resource blocks (RBs);

$S_f$=a TRS subcarrier spacing in a frequency domain; and $S_t$=a TRS symbol spacing between two neighboring TRS symbols of the plurality of TRS symbols in a time domain.

8. The method of claim 7, wherein N=2, wherein there are fourteen OFDM symbols within each slot as denoted by symbol 0, symbol 1, symbol 2, symbol 3, symbol 4, symbol 5, symbol 6, symbol 7, symbol 8, symbol 9, symbol 10, symbol 11, symbol 12 and symbol 13, and wherein two of the fourteen OFDM symbols used for TRS comprise a pair of symbol 4 and symbol 8, a pair of symbol 5 and symbol 9, or a pair of symbol 6 and symbol 10.

9. The method of claim 7, wherein, for the TRS burst, X=2, $N_1$=2 for a first slot of the TRS burst, $N_2$=2 for a second slot of the TRS burst, and there are four TRS symbols in the TRS burst ($N_{total}$=4), wherein $S_{t1}$ denotes a symbol spacing between a first TRS symbol in the first slot and a second TRS symbol in the first slot, wherein $S_{t2}$ denotes a symbol spacing between the second TRS symbol in the first slot and a first TRS symbol in the second slot, wherein $S_{t3}$ denotes a symbol spacing between the first TRS symbol in the second slot and a second TRS symbol in the second slot, and wherein $S_{t2}$ is greater than or equal to $S_{t3}$ which is greater than or equal to $S_{t1}$ ($S_{t2}>=S_{t3}>=S_{t1}$).

10. The method of claim 9, wherein $S_{t3}=S_{t1}$.

11. The method of claim 9, wherein $S_{t3}>S_{t1}$.

12. The method of claim 9, wherein $S_{t2}>=S_{t3}>S_{t1}$.

13. The method of claim 7, wherein, for the TRS burst, X=1, $N_1$=2 for a first slot of the TRS burst and there are two TRS symbols in the TRS burst ($N_{total}$=2), and wherein $S_{t1}$ denotes a symbol spacing between a first TRS symbol in the first slot and a second TRS symbol in the first slot.

14. The method of claim 13, wherein $S_{t1}>=3$.

15. An apparatus implementable in a user equipment (UE), comprising:

a transceiver capable of wirelessly communicating with a base station of a network; and a processor coupled to the transceiver, the processor capable of performing operations comprising:

receiving, via the transceiver from the base station, a reference signal via a communication link between the UE and the base station, the reference signal containing resource configuration with respect to tracking reference signal (TRS) configuration;

receiving, via the transceiver from the base station, a TRS burst containing a plurality of TRS symbols with one or more components of the UE configured according to the TRS configuration; and processing the TRS burst to perform channel estimation, synchronization, time tracking, frequency tracking, or a combination thereof, wherein the processor receives the plurality of TRS symbols of the TRS burst through a same antenna port of the UE, wherein the plurality of TRS symbols occupy a same subcarrier location, and wherein, in an event that the channel estimation comprises frequency offset estimation, in processing the TRS burst to perform the channel estimation, the processor performs the frequency offset estimation by extracting a phase difference between TRS resource elements (REs) in two of the plurality of TRS symbols that are in a same slot.

16. The apparatus of claim 15, wherein the channel estimation comprises one or more of time delay estimation, delay spread estimation, frequency offset estimation, and Doppler spread estimation, and wherein a symbol spacing between two neighboring TRS symbols in the TRS burst is greater than or equal to 3 symbols.

17. The apparatus of claim 15, wherein the TRS configuration defines a plurality of parameters comprising:

X=a length of the TRS burst in terms of a number of 14-symbol slots;

Y=a periodicity of the TRS burst;

N=a number of orthogonal frequency-division multiplexing (OFDM) symbols occupied by one or more TRS symbol of the plurality of TRS symbols within each slot;

B=a TRS bandwidth in terms of a number of resource blocks (RBs);

$S_f$=a TRS subcarrier spacing in a frequency domain; and $S_t$=a TRS symbol spacing between two neighboring TRS symbols of the plurality of TRS symbols in a time domain.

18. The apparatus of claim 17, wherein N=2, wherein there are fourteen OFDM symbols within each slot as denoted by symbol 0, symbol 1, 2, 3, symbol 4, symbol 5, symbol 6, symbol 7, symbol 8, symbol 9, symbol 10, symbol 11, symbol 12 and symbol 13, and wherein two of the fourteen OFDM symbols used for TRS comprise a pair of symbol 4 and symbol 8, a pair of symbol 5 and symbol 9, or a pair of symbol 6 and symbol 10.

19. The apparatus of claim 17, wherein, for the TRS burst, X=2, $N_1$=2 for a first slot of the TRS burst, $N_2$=2 for a second slot of the TRS burst, and there are four TRS symbols in the TRS burst ($N_{total}$=4), wherein $S_{t1}$ denotes a symbol spacing between a first TRS symbol in the first slot and a second TRS symbol in the first slot, wherein $S_{t2}$ denotes a symbol spacing between the second TRS symbol in the first slot and a first TRS symbol in the second slot, wherein $S_{t3}$ denotes a symbol spacing between the first TRS symbol in the second slot and a second TRS symbol in the second slot, and wherein $S_{t2}$ is greater than or equal to $S_{t3}$ which is greater than or equal to $S_{t1}$ ($S_{t2}>=S_{t3}>=S_{t1}$).

20. The apparatus of claim 17, wherein, for the TRS burst, X=1, $N_1$=2 for a first slot of the TRS burst and there are two TRS symbols in the TRS burst ($N_{total}$=2), and wherein $S_{t1}$ denotes a symbol spacing between a first TRS symbol in the first slot and a second TRS symbol in the first slot.

* * * * *